United States Patent [19]

Marinus

[11] Patent Number: 5,041,956
[45] Date of Patent: Aug. 20, 1991

[54] SWITCHED-MODE POWER SUPPLY CIRCUIT INCLUDING A STARTING CIRCUIT

[75] Inventor: Antonius A. M. Marinus, Eindhoven, Netherlands

[73] Assignee: U.S. Philips Corporation, New York, N.Y.

[21] Appl. No.: 478,804

[22] Filed: Feb. 12, 1990

[30] Foreign Application Priority Data

Mar. 2, 1989 [NL] Netherlands ................. 8900508

[51] Int. Cl.$^5$ ................. H02M 3/335; H02M 7/5375
[52] U.S. Cl. ........................ 363/21; 363/49; 363/56
[58] Field of Search ............... 363/21, 49, 56; 315/411

[56] References Cited

U.S. PATENT DOCUMENTS

| | | |
|---|---|---|
| 3,959,714 | 5/1976 | Mihelich . |
| 4,180,852 | 12/1979 | Koizumi et al. ............ 363/49 |
| 4,353,114 | 10/1982 | Saleh ........................ 363/21 |
| 4,688,159 | 8/1987 | Marinus ..................... 363/21 |
| 4,791,544 | 12/1988 | Gautherin et al. .......... 363/49 |

FOREIGN PATENT DOCUMENTS

| | | |
|---|---|---|
| 331592 | 9/1989 | European Pat. Off. . |
| 22758 | 1/1986 | Japan . |

OTHER PUBLICATIONS

Stuedemann, Funk-Technik 37 (1982), Heft 1, pp. 21-25.
Stephens, "Flyback Converters for Multirail Switchers", New Electronics, vol. 14, No. 14, pp. 58-60, Jul. 14, 1981.
Biamonte et al, "Transistor Switching Regulator Starting and Monitoring", IBM Tech. Discl. Bul., vol. 23, No. 12, pp. 5449-5451, May 1981.

Primary Examiner—William H. Beha, Jr.
Attorney, Agent, or Firm—Bernard Franzblau

[57] ABSTRACT

A switched mode power supply circuit includes a controllable switch for controlling the current in the supply transformer of the power supply circuit. During normal operation of the power supply, its DC output voltage is maintained at a substantially constant, first value in spite of variations of the DC input voltage and of the load on the output voltage by controlling the duration of the conductivity time of the switch. A function generator supplies a signal, which is a given function of the output voltage, to a control input of a pulse duration modulator for determining the duration of the conductivity time. At an output voltage which is considerably lower than the first value, the signal of a starting circuit is passed on by a selection circuit to the said control input in order to increase the conductivity time of the switch. This signal corresponds to a shorter switch conductivity time than does the signal of the function generator. At the instant when the output voltage reaches the first value, the selection circuit blocks the passage of the start signal and passes on the signal of the function generator. The power supply thus provides a soft start with limited energy dissipation.

15 Claims, 3 Drawing Sheets

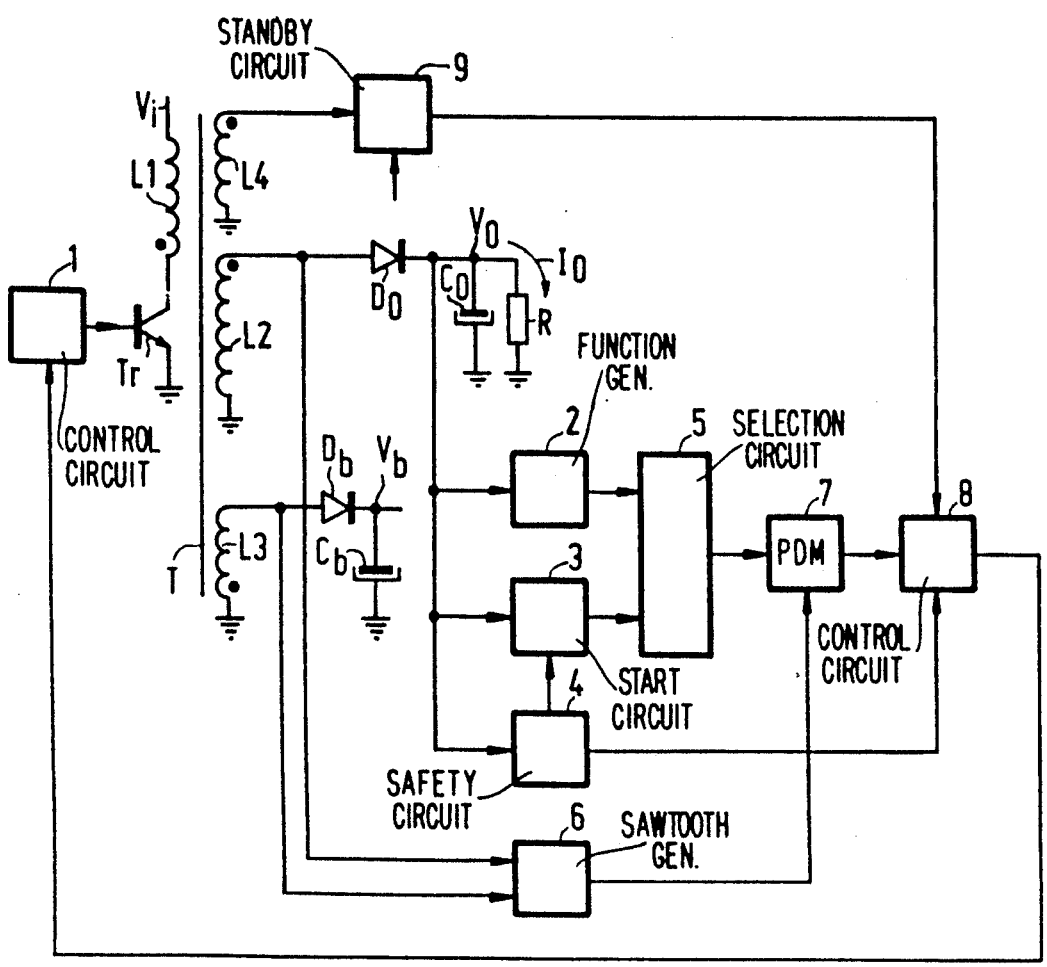
FIG.1
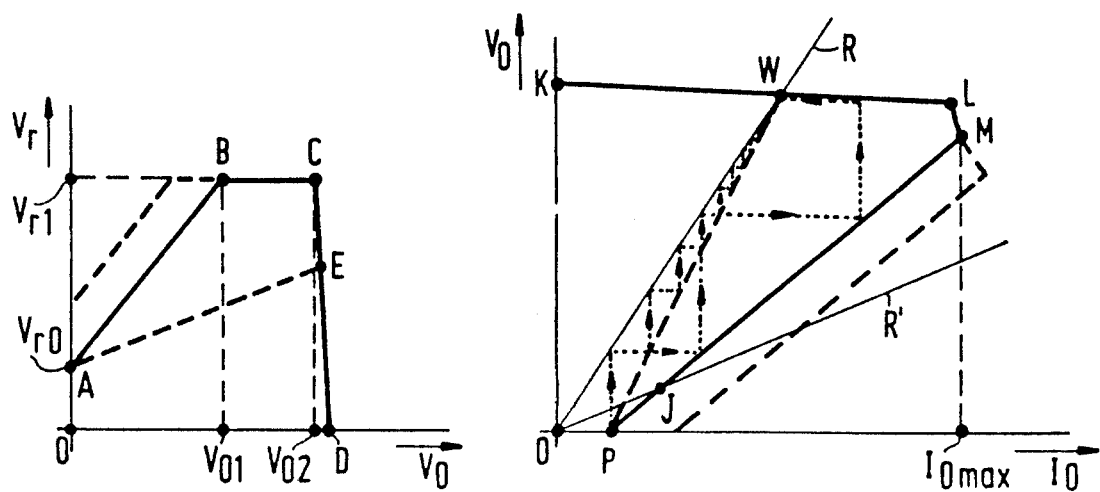
FIG.3a
FIG.3b

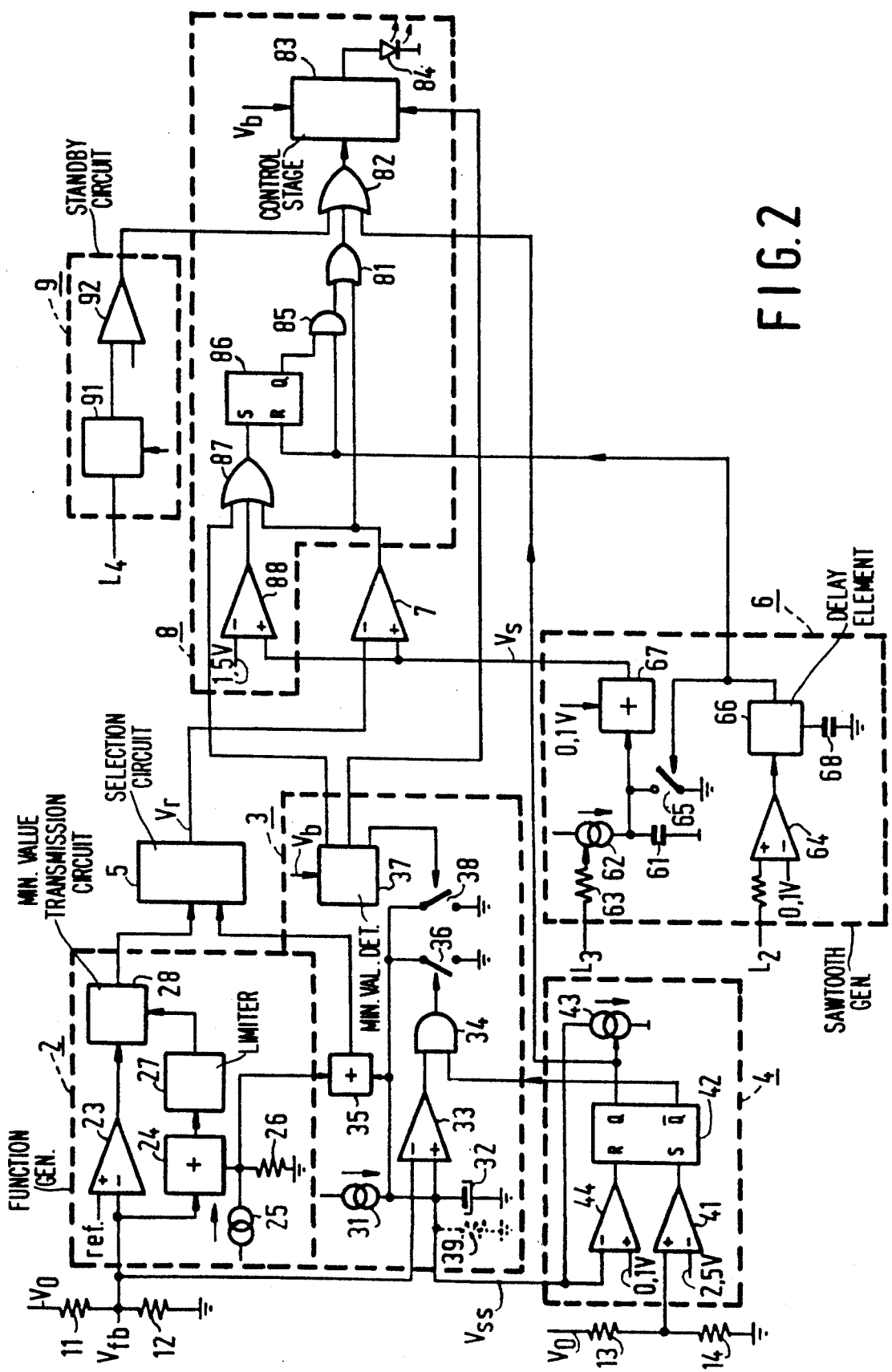

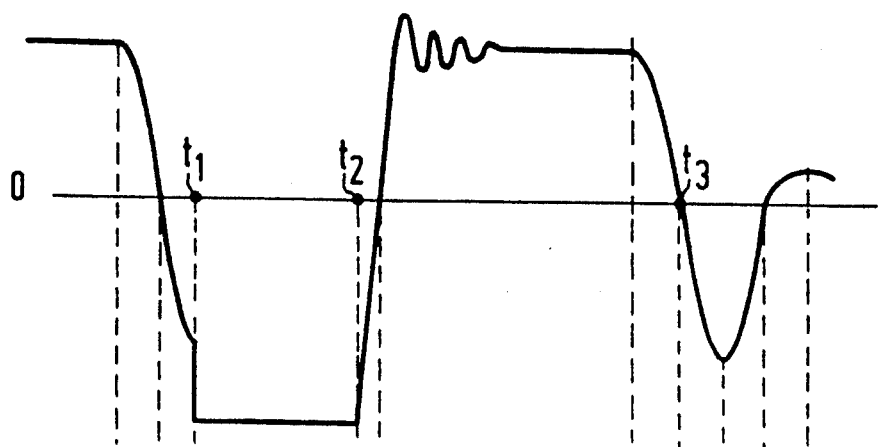
FIG. 4a
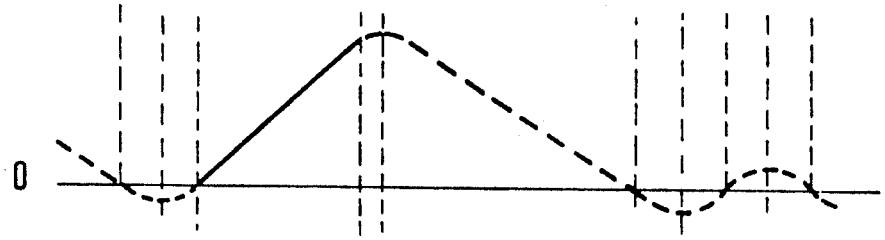
FIG. 4b
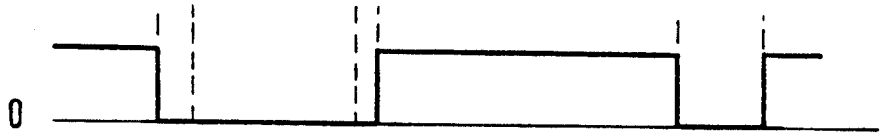
FIG. 4c
FIG. 4d
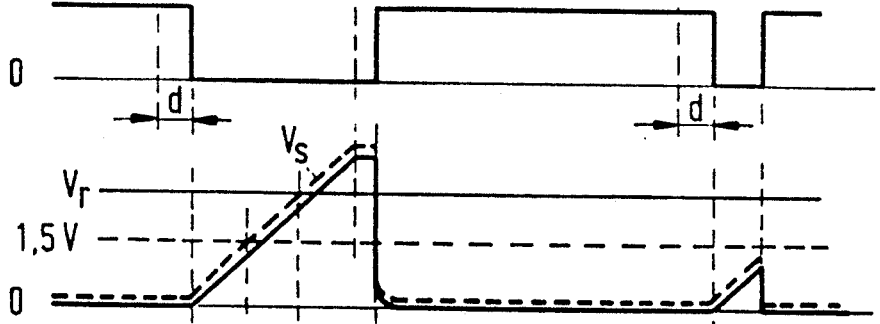
FIG. 4e
FIG. 4f
FIG. 4g
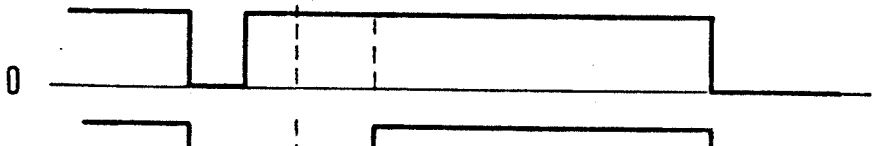
FIG. 4h
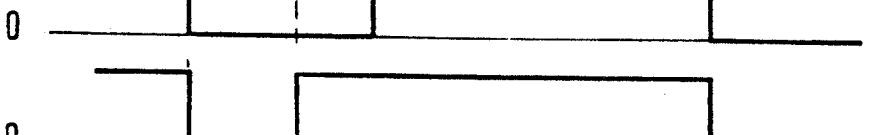
FIG. 4i

SWITCHED-MODE POWER SUPPLY CIRCUIT INCLUDING A STARTING CIRCUIT

BACKGROUND OF THE INVENTION

This invention relates to a switched-mode power supply circuit comprising a series arrangement of an inductive element and a controllable switch coupled between the terminals of a DC input voltage. A rectifier is coupled to the inductive element for making a DC output voltage available at a load connected thereto and a control circuit is coupled to the switch for rendering the switch alternately conducting and non-conducting. A pulse duration modulator is coupled to the control circuit for determining the duration of the conductivity time of the switch. A function generator is provided for applying a signal, which is a given function of the output voltage, to a control input of the modulator for maintaining the output voltage at a substantially constant, first value which is independent of the values of the input voltage and of the load, and means are also provided for bringing the output voltage to a second value which is considerably lower than the first value by keeping the conductivity time of the switch shorter.

A power supply circuit of this type is known from an article in the German magazine "Funktechnik" 37 (1982), no. 1, pp. 21-25. It is apparent from this publication that the output characteristic of the known circuit, i.e. the diagram of the variation of the output voltage as a function of the output current flowing through the load, has a shape which is folded back (current foldback characteristic). If the output current has a value between zero and a given maximum value, the output voltage has the first value so that the characteristic is a substantially horizontal straight line. This is ensured by the above-mentioned control of the duration of the conductivity time of the controllable switch. If the output current exceeds the maximum value, the conductivity time will be quickly reduced so that the output voltage will be considerably lower than aforesaid the first value (which holds for the nominal case) and by which the peak power is reduced to a value which is within safe limits for the load and for the supply. If the output voltage is zero, i.e. if the load is a short circuit, the output current is limited to a given, small value. The characteristic is thus folded back between the point in the diagram representing the maximum value of the current and the point corresponding to the short circuit. The supply circuit remains operative under all circumstances.

During the transition to the normal operating condition after switching on the power supply circuit, the output voltage increases to the nominal value because the successive conductivity periods of the switch become longer, the working point in the diagram being displaced from the origin of the system of coordinates to the point of the characteristic corresponding to the nominal value. If the output voltage has assumed a low value due to an overload, the working point is displaced towards the nominal position similarly to the case after switching on, unless the interference is still present, in which case the output voltage remains at the low value. The increase of the output voltage is slower than its decrease, thus ensuring that each time no large peak currents flow which would be a heavy burden for the components of the circuit. This enhances its reliability. During such a soft start both the output voltage and the output current increase simultaneously until the working point has reached the position on the characteristic curve which corresponds to the maximum value of the current, while the voltage substantially has the nominal value. Subsequently, the control ensures that the nominal condition is reached, i.e. the working point moves along the horizontal portion of the characteristic curve, while the current becomes smaller. It is apparent therefrom that during the start an unnecessarily large amount of energy is dissipated.

SUMMARY OF THE INVENTION

It is an object of the invention to provide a power supply circuit in which the output current does not assume a too large value during the start. To this end the circuit according to the invention is characterized by a selection circuit for passing on the signal of a starting circuit to the control input of the pulse duration modulator at an output voltage which has the said second value for causing the duration of the conductivity time of the controllable switch to increase in order to bring the output voltage to the first value, said signal corresponding to a shorter conductivity time of the switch than the signal of the function generator, said selection circuit passing on the signal of the function generator to the said control input when the output voltage reaches the first value.

During the start the output voltage in the circuit according to the invention does not increase under the influence of the control of the conductivity time of the controllable switch, but it increases under the influence of the starting circuit. The output voltage then has a lower value than would be the case due to the control, while the output current is always smaller than its maximum value. The dissipation of energy is thus limited and the output voltage increases more slowly than in the known supply circuit. During the start the function generator is operative, but it does not have any influence on the switching behaviour of the switch. When the output voltage has reached the nominal value, the conductivity time of the switch is determined by the control because the selection circuit passes on the signal of the function generator to the pulse duration modulator, while the starting circuit no longer has any influence. This is the normal operating condition. Since the output current does not reach its maximum value after each switch-on and after each disturbance, the load on the components of the supply circuit is not too large.

It will be noted that such a starting circuit is known per se, for example, from the publication Philips, Electronic components and materials, "Technical information 020: Switched-mode power supplies in TV receivers, Control circuits" of 21 Sept. 1976. When a safety circuit becomes operative, the path between the pulse duration modulator and the controllable switch is blocked according to this publication, resulting in the supply circuit no longer operating and the output voltage becoming zero, whereafter the starting circuit ensures a soft start. On the other hand the supply according to the invention also remains operative after a disturbance, albeit at a low level, so that small and short-lasting disturbances cannot render the supply inoperative for a long time.

In one embodiment, the circuit according to the invention is characterized in that the selection circuit is a minimum value transmission circuit for passing on a control signal to the control input of the modulator, a lower value of the control signal corresponding to a shorter conductivity time of the controllable switch, and conversely. In a simple embodiment the circuit is characterized in that the starting circuit comprises a source for charging a storage element, the signal of the storage element being higher than the signal from the function generator when the output voltage has the first value, and being lower than this signal when the output voltage has the second value or a value which is higher than a predetermined value which is higher than the first value. The signal of the storage element is thus high when the output voltage has the first value and under these circumstances it does not have any influence on the operation of the supply circuit. At an output voltage value which is considerably lower than the first value, for example, due to an overload or because the output voltage has been decreased by means of a stand-by circuit, the signal of the storage element is low. The circuit is now suitable for a soft start, with the output voltage increasing gradually.

The circuit is advantageously characterized by a bistable element for discharging the storage element in a first state, for rendering the clamping circuit inoperative and for blocking the controllable switch at a value of the output voltage which is higher than a predetermined value. The bistable element is in its second state when the signal of the storage element is lower than a further predetermined value, in which second state both the signal of the storage element and the output voltage increase while the clamping circuit is operative. This is a protection against overvoltage, for which the starting circuit ensures that a soft start can take place as soon as the overvoltage is ended.

BRIEF DESCRIPTION OF THE DRAWING

The invention will be described in greater detail, by way of example, with reference to the accompanying drawings, in which:

FIG. 1 is a block-schematic diagram of the power supply circuit according to the invention, FIG. 2 shows some details of the circuit diagram of FIG. 1, FIGS. 3a and 3b shows diagrams relating to the circuit, and FIGS. 4a to 4i shows waveforms occurring in the circuit.

DESCRIPTION OF THE PREFERRED EMBODIMENTS

The power supply circuit of FIG. 1 comprises a controllable switch in the form of an NPN switching transistor Tr whose collector is connected to the primary winding L1 of a transformer T and whose emitter is connected to ground. The other end of winding L1 is connected to the positive terminal of a DC input voltage source $V_i$ whose negative terminal is also connected to ground and which is, for example, a mains rectifier. The base lead of transistor Tr is connected to a control circuit 1 for turning the transistor alternately on and off.

Transformer T has a plurality of secondary windings. One of these windings, L2, has one end connected to ground. The other end is connected to the anode of a rectifier $D_o$ whose cathode is connected to a smoothing capacitor $C_o$ and a load represented by a resistor R. The terminals of capacitor $C_o$ and resistor R which are not connected to rectifier $D_o$ are connected to ground. The winding sense of windings L1 and L2, which is conventionally denoted by dots, as well as the direction of conductivity of rectifier $D_o$ are chosen so that, in operation, a current flows through the one winding while the other winding is currentless. A DC output voltage $V_o$ is present across the load R. The said elements form part of a switched-mode power supply circuit of known type, in which the control of the duration of the time intervals in which transistor Tr is turned on ensures that voltage $V_o$ has a substantially constant value which is independent of the values the input of voltage $V_i$ and of the load R. The circuit of FIG. 1 may be, for example, a supply circuit for a television receiver. The loads on the secondary windings of the transformer T are formed by the various circuits in the TV receiver. A current flows through one of these windings, L3, during the same period when a current flows through winding L1.

The output voltage $V_o$ is applied to a function generator 2, to a starting circuit 3 and to a safety circuit 4. The other output ends of generator 2 and start circuit 3 are connected to a selection circuit 5. Windings L2 and L3 are connected to a sawtooth generator 6. The sawtooth-shaped signal generated thereby and an output signal from selection circuit 5 are applied to a pulse duration modulator 7, an output signal of which is applied to a control circuit 8. A secondary winding L4 of transformer T is connected to a stand-by circuit 9. Circuit 9 has its output end coupled to stage 8 and stage 8 is coupled to control circuit 1.

FIG. 2 shows the details of the power supply circuit of FIG. 1. The series arrangement of two resistors 11 and 12 is connected between voltage $V_o$ and ground. The function generator 2 comprises a differential amplifier 23, an inverting input of which is connected to the junction point of the resistors 11 and 12. This point conveys a voltage $V_{fb}$ which is proportional to the voltage $V_o$. In another embodiment the voltage divider 11, 12 may be dispensed with. An input of an adder stage 24 is connected to the same point. A current source 25 is connected to another input of adder stage 24 and a resistor 26 is arranged between this input and ground. A reference voltage is connected to a non-inverting input of amplifier 23. The difference between the negative feedback voltage $V_{fb}$ and the reference voltage is amplified by amplifier 23 and stage 24 adds voltage $V_{fb}$ to the voltage caused by source 25 across resistor 26. The sum voltage obtained at an output of adder stage 24 is applied to a limiter 27. The voltage thus obtained and the voltage which is present at an output of amplifier 23 are applied to a minimum value transmission circuit 28. This circuit passes on the lowest of said voltages to the selection circuit 5. Circuit 5 also receives a voltage which originates from the starting circuit 3. Circuit 5 is also a minimum value transmission circuit and the lowest of the two input voltages of circuit 5 is passed on to an inverting input of the modulator 7, formed as a differential amplifier, for controlling the modulator as a function of the output voltage $V_o$. In the normal operating condition of the supply circuit the voltage at the output of circuit 28 is always lower than the voltage which originates from the start circuit 3, so that the first-mentioned voltage is passed on through circuit 5. In practice, such a minimum value transmission circuit can be formed by means of two emitter-coupled PNP transistors whose bases are connected to the respective voltages to be compared, the lowest of these voltages turning on the associated transistor.

A solid line in FIG. 3a denotes the transfer characteristic of elements 2 and 5, i.e. the diagram of the variation of the voltage $V_r$ passed on by circuit 5 as a function of the voltage $V_o$ in the case where the starting circuit 3 is not operative. If voltage $V_o$ is zero, voltage $V_r$ has a given value $V_{ro}$ which can be set by means of elements 25 and 26 (point A in FIG. 3a). The characteristic curve is linear up to a given value $V_{r1}$ which is reached when $V_o=V_{o1}$ (point B). If voltage $V_o$ is higher than $V_{o1}$, limiter 27 becomes operative, resulting in voltage $V_o$ no longer increasing. At values of voltage $V_o$ which are lower than a value $V_{o2}$ (point C), bit which is higher than $V_{o1}$, the voltage at the output of amplifier 23 is higher than the voltage of limiter 27 so that the selection then passes on the last-mentioned voltage. At values of voltage $V_o$ which are higher than $V_{o2}$ the voltage at the output of amplifier 23 is lower than that of limiter 27, so that the voltage at the amplifier output is then passed on. This voltage decreases very steeply at increasing values of voltage $V_o$ and becomes zero at a point D.

The sawtooth generator 6 includes a capacitor 61 which is charged by a current source 62. The value of the current of source 62 is determined by a resistor 63 which is connected to winding L3. Since winding L3 conveys a current simultaneously with winding L1, source 62 is operative during the interval of conductance of transistor Tr. The voltage of winding L2 is compared with a reference voltage of, for example, 100 mV by means of a differential amplifier 64. If the voltage across winding L2 exceeds this value, which takes place during the period when transistor Tr is turned off, a switch 65 arranged parallel to capacitor 61 becomes conductive so that the capacitor is discharged. The starting instant of charging is delayed by means of a delay element 66. The reason for this will be explained hereinafter. Under these circumstances a sawtooth-shaped voltage, whose peak value is a measure of the peak value of the collector current of transistor Tr and of the value of voltage $V_i$, is produced across capacitor 61. A voltage of approximately 100 mV is added to the sawtooth by means of an adder stage 67 and the voltage $V_s$ obtained is applied to a non-inverting input of amplifier 7. In another embodiment the sawtooth generator may be an oscillator.

In operation amplifier 7 compares the output voltage $V_r$, passed on by the selection circuit 5 to the control input of the amplifier with the voltage $V_s$. The control circuit 8 has an OR gate 81, an input of which is connected to an output of amplifier 7. Via a second OR gate 82 the output signal of amplifier 7 reaches a control stage 83 which drives a light-emitting diode 84. Diode 84 is optically coupled to a photosensitive element which forms part of the control circuit 1 of transistor Tr. At an instant when the voltage $V_r$ is lower than $V_s$, the output signal of amplifier 7 is high so that diode 84 conveys a current. Circuit 1 is adapted in a known manner so that transistor Tr is then turned off. However, at an instant when voltage $V_r$ is higher than $V_s$, transistor Tr is turned on. The lower the voltage $V_r$ with respect to voltage $V_s$, the shorter the conductivity time of transistor Tr, and conversely. As a result, the voltage $V_o$ is controlled. If, for example, the load decreases, voltage $V_o$ increases. Voltage $V_r$ decreases (line section CD in FIG. 3a). As a result, diode 84 starts conducting at an earlier instant than would otherwise be the case so that transistor Tr is turned off at an earlier instant. The peak value of the collector current decreases. The energy stored in transformer T during the conductivity time of the transistor decreases, which counteracts the increase of voltage $V_o$. At a larger load the opposite applies, i.e. the conductivity time of transistor Tr increases. If voltage $V_i$ increases, so that voltage $V_o$ would increase, voltage $V_s$ also increases, resulting in the said conductivity time becoming shorter, which stabilizes $V_o$.

A solid line in FIG. 3b shows the output characteristic of the supply circuit, i.e. the diagram of the variation of the output voltage $V_o$ as a function of the output current $I_o$ flowing through the load R. The characteristic has a given shape due to the fact that voltage $V_r$ has the variation shown in FIG. 3a as a function of the voltage $V_o$. The characteristic of FIG. 3b is a substantially horizontal straight line between the value 0 and a given value of current $I_o$ (between points K and L in FIG. 3b). At higher values of the current the voltage slightly decreases, while the current slightly increases and reaches a maximum value $I_{omax}$ (point M), whereafter both the voltage and the current decrease steeply. The characteristic is then a substantially straight line reaching the $I_o$ axis at a point P which corresponds to a low value of $I_o$, i.e. the value at a short-circuited load ($V_o=0$). Such a characteristic is known under the name of current fold-back characteristic. The diagrams of FIGS. 3a and b correspond to each other, more specifically such that point A corresponds to point P, B corresponds to M, C corresponds to L and D corresponds to K. FIG. 3b also shows the straight line representing resistor R at the nominal value of this resistor. This line intersects the line section KL at point W which represents the nominal working point and which corresponds to a point E located on the line section CD in FIG. 3a. The control of the period of conductance of transistor Tr implies that, in operation, the working point is displaced along the line section KL around point W. A straight line, which would have been drawn between the origin 0 of the system of coordinates and point L, indicates the minimum value of resistor R. Point A determines the minimum period of conductance of transistor Tr in the case of a short-circuited output and its setting influences both characteristics: this is denoted in FIG. 3 by means of broken lines in accordance with a line running parallel to the solid lines AB and MP, respectively. The maximum value of the collector current of the transistor is determined by means of limiter 27 and therefore the maximum value of voltage $V_r$ and of current $I_o$ is determined. It is achieved by means of stage 67 that the level of voltage $V_r$ may be lower than voltage $V_s$, for example, in unloaded operation at which it must be possible for the working point to be displaced to point D, i.e. the point for which the period of conductance of transistor Tr is zero.

The starting circuit 3 comprises a current source 31 for charging a storage element in the form of a capacitor 32. The junction point of elements 31 and 32 is connected to a non-inverting input of a differential amplifier 33, an inverting input of which is connected to the junction point of resistors 11 and 12. The output of amplifier 33 is connected to an input of an AND gate 34. An input of an adder stage 35 is connected to the junction point of elements 25 and 26, another input is connected to the junction point of elements 31 and 32 and an output is connected to the second input of selection circuit 5. An output of gate 34 operates a switch 36 arranged parallel to capacitor 32.

Circuit 4 is an overvoltage protection circuit. The voltage at the junction point of two resistors 13 and 14, which are arranged in series between the output voltage $V_o$ and ground, is compared with a reference voltage of, for example, 2.5 V by means of a differential amplifier 41. An output of amplifier 41 is connected to a set input of a flip-flop 42. A non-inverting output Q of flip-flop 42 controls a discharge current source 43 for capacitor 32 and is connected to a second input of gate 82. An inverting output Q of flip-flop 42 is connected to a second input of gate 34. The voltage across capacitor 32 is compared with a reference voltage of, for example, 100 mV by means of a differential amplifier 44 and an output of amplifier 44 is connected to a reset input of flip-flop 42.

In the normal operating condition power of the supply circuit the voltage at the junction point of resistors 13 and 14 is lower than approximately 2.5 V. The signal applied by flip-flop 42 to gate 34 is a 1, while source 43 is inoperative. If the voltage $V_{ss}$ generated by source 31 across capacitor 32 is higher than the voltage $V_{fb}$, switch 36 starts conducting so that the capacitor is quickly discharged. Voltage $V_{ss}$ decreases. In the opposite case the switch is blocked so that the said voltage increases. It is apparent therefrom that voltage $V_{ss}$ is always clamped at substantially the value of voltage $V_{fb}$. This value is substantially constant in the normal operating condition and it is higher than the voltage applied by generator 2 to circuit 5 and therefore has no influence on the control of the output voltage. A resistor 39, shown in broken lines, may be arranged parallel to capacitor 32. The voltage across the capacitor is thereby decreased to the value of the voltage drop produced by source 31 across the resistor. The resistor can be chosen such that the voltage applied by stage 35 to circuit 5 is the lowest of the input voltages of this circuit so that transistor Tr is turned off at an earlier instant than would otherwise be the case. It is apparent therefrom that the provision of the said resistor ensures that the peak value of the collector current of the transistor can be set to a given value by means of the starting circuit 3.

When switching on the television receiver of which the described power supply circuit forms a part, all voltages are initially zero. The voltage at the output of amplifier 23 becomes high. A voltage drop is produced across resistor 26 by source 25 and is added to the slowly increasing voltage across capacitor 32 by means of stage 35. The said voltage drop determines the minimum period of conductance of transistor Tr via selection circuit 5, in which period energy is applied to transformer T. The output voltages of the supply circuit thus increase. A minimum value detector 37 compares a direct voltage $V_b$, which is derived from winding L3 by means of a rectifier $D_b$ and which is present across a smoothing capacitor $C_b$ (FIG. 1), with a reference value of, for example, 6 V. As long as voltage $V_b$ is lower than this value, stage 83 is blocked by detector 37, which makes a soft start possible. Source 31 charges capacitor 32 so that the voltage $V_{ss}$ increases slowly, i.e. more slowly than the voltage at the output of function generator 2 so that the voltage applied by the start circuit 3 to the selection circuit 5 is lower than the voltage of generator 2. The voltage of start circuit 3 is passed on as the voltage $V_r$ by circuit 5 to modulator 7 so that the period of conductance of transistor Tr slowly increases. The said period of conductance is shorter than would be the case under the influence of the output voltage of generator 2. The rate at which voltage $V_{ss}$ increases is set by the choice of the capacitance of capacitor 32. The normal operating condition starts as soon as the voltage applied by stage 35 to circuit 5 exceeds the voltage applied by circuit 28 to circuit 5, which takes place when $V_o$ has reached the value $V_{o2}$, in which state the voltage of the function generator 2 is passed on by the selection circuit 5 to modulator 7 for controlling the duration of the period of conductance of transistor Tr, while the voltage $V_{ss}$, which no longer has any influence on the said duration, remains substantially constant. In FIG. 3 the characteristic curve of the starting circuit is plotted in broken lines AE and PW, respectively.

Voltage $V_b$ is the supply voltage of an integrated circuit comprising most parts of the circuit of FIG. 2. It will be noted that the value of voltage $V_b$, which is derived from winding L3, is not dependent on the value of $V_o$, but on that of $V_i$, more specifically because the integrated circuit must also be active in the case of a short-circuited voltage $V_o$. If, in operation, voltage $V_b$ became lower than 5 V, at which value the integrated circuit cannot function properly, diode 84 would remain currentless and transistor Tr would continuously conduct, resulting in the transistor being damaged. This is avoided because the control circuit 1 has a facility for releasing the control of the transistor when the voltage $V_b$ is higher than 6 V. Capacitor 32 is also reset because the switch 38, which is arranged parallel to switch 36, becomes conductive under its nominal influence of detector 37.

If the voltage $V_o$ becomes considerably lower than the value in the normal operating condition, voltage $V_{fb}$ decreases proportionally. Voltage $V_{ss}$ decreases accordingly to the value of $V_{fb}$ so that the voltage at the output of stage 35 becomes lower than that of function generator 2 and is thus passed on to modulator 7. This condition occurs in the case of an overload at which resistor R assumes a smaller value R' such that the load line in FIG. 3b intersects the characteristic curve at a working point J which is located on the line section MP. However, if the voltage $V_o$ increases to such an extent that the protection level at the junction point of resistors 13 and 14 becomes higher than 2.5 V, flip-flop 42 is set. A logic 1 is then present at the output Q of flip-flop 42 so that the source 43 becomes active and discharges capacitor 32 slowly. Voltage $V_{ss}$ decreases. Simultaneously gate 34 is blocked by a logic 0 at the output Q so that switch 36 is not operated. Voltage $V_o$ does not have any influence on the starting circuit. Otherwise voltage $V_{ss}$ would be equal to $V_{fb}$ and the discharge of capacitor 32 would be influenced by the load current. Stage 83 is controlled by flip-flop 42 via OR gate 82 to cause diode 84 to conduct continuously and thus to turn off transistor Tr. Both in the case of the overload and in the case of the overvoltage the starting voltage $V_{ss}$ is low. At the instant when voltage $V_{ss}$ becomes lower than 100 mV, flip-flop 42 is reset by amplifier 44 so that the discharge of capacitor 32 is discontinued, while AND gate 34 again receives a logic 1 and transistor Tr is released. A new start can then begin.

The stand-by circuit 9 comprises a stage 91 which is connected to winding L4 and which ensures, under the influence of a switching signal, that the output voltages of the supply circuit are decreased considerably. Stage 91 is connected to a comparison stage 92, an output of which is connected to a third input of gate 82. In the stand-by conditions a periodically interrupted oscillation is generated at a low frequency (burst mode). Such a circuit is described in Netherlands Patent Application No. 8502338 which corresponds to U.S. Pat. No. 4,688,159 (8/18/87), and which is hereby incorporated by reference. If the voltage across winding L4 exceeds a given level, diode 84 conducts so as to turn off transistor Tr so that the said voltage decreases again. If under these circumstances another level is reached which is lower than the first-mentioned level, stage 83 is again blocked so as to turn on transistor Tr.

If an overload occurs at an instant during the period of conductance of transistor Tr, energy, which cannot immediately disappear, is present in transformer T at that instant. The working point follows the characteristic curve along the points L and M and the line section MP towards the new position J. If the overload occurs at an instant during the period when the transistor is turned off, the transformer has no or little energy at that instant so that to reach point J the working point follows a path shorter than the characteristic curve. Also in the case of an overvoltage and when setting the stand-by state, the working point is displaced to a point located on the line section PM of the characteristic curve in the vicinity of point P. In all these cases the supply circuit remains operative in the normal manner, albeit that the output voltage and the output current have low values. The voltage $V_{ss}$ is always clamped at the value of voltage $V_{fb}$, a soft start is created at which the output voltages of the supply circuit increase gradually until the nominal position W on the characteristic curve is reached again, unless the disturbance or the stand-by state occurs again. It is apparent therefrom that small and short-lasting disturbances cannot render the supply circuit inactive for a long time If, for example, the overload is a short circuit of voltage $V_o$, the working point is located at point P. If the short circuit is eliminated, so that the load is again formed by resistor R, the current $I_o$ initially flowing therethrough produces a voltage drop which is denoted in FIG. 3b by a broken vertical line between point P and the load line representing the load R. The point of intersection formed on the characteristic curve PW of the starting circuit corresponds to a point which is denoted by a horizontal line. This new point yields a new value of current $I_o$. It is apparent therefrom that the working point is displaced along a staircase-shaped curve and reaches point W without large values of current $I_o$ occurring. The same applies to the start operations after switching on the receiver, at which the working point reaches the position W from point 0. Both in FIG. 3a and in FIG. 3b the working point follows a path shorter than the original characteristic curve. For the purpose of comparison, FIG. 3b shows as a dotted line the staircase shape along which the working point would be displaced without the starting circuit, which staircase shape reaches the line section PM. The last vertical line of this staircase shape, the third line in the Figure, intersects the line section KL in the characteristic curve at a point which is located to the right of point W and which represents a situation with a larger output current. Under these circumstances the maximum value $I_{omax}$ can be reached. After reaching the line section KL the control is activated so that the working point is no longer displaced along the veritcal line but moves to the left along the line section KL until it assumes the position W. It will be clear that the dissipation is larger than is the case with the starting circuit.

The operation of the supply circuit is improved by the delay element 66 referred to hereinbefore and by parts of the control circuit 8 which will now be described. Firstly, an AND gate 85 is provided having an output connected to a second input of the OR gate 81. An input of gate 85 is connected to a non-inverting output Q of a flip-flop 86. The output of delay element 66, which controls switch 65, is connected to a reset input of flip-flop 86 and to another input of gate 85. Connected to a set input of flip-flop 86 is the output of an OR gate 87, a first input of which is connected to the output of modulator 7, a second input is connected to an output of a differential amplifier 88 and a third input is connected to detector 37. The output of adder stage 67 is connected to a non-inverting input of amplifier 88 and an inverting input of this amplifier is connected to a reference voltage of, for example, 1.5 V.

During the time interval in which the switching transistor Tr is turned off, decreasing currents flow through a plurality of secondary windings of transformer T, in this embodiment windings L2 and L4. The transformer is demagnetized thereby. If the transistor were turned on again in this interval, it would not be possible for the transformer to be discharged and it might consequently become saturated. This is undesirable. The control of the transistor must therefore be such that the transistor Tr is not turned on again before the secondary current has become zero. A usable measure in this case is the fact that the voltage across a secondary winding quickly assumes a given polarity after transistor Tr is turned off, for example, the voltage becomes positive across winding L2 and this polarity is maintained as long as the rectifier connected thereto is conducting and passes the demagnetizing current, whereafter the said voltage decreases, becomes zero and then negative. If the transistor is still turned off, there is the possibility that ringing effects may occur which are caused by the inductance of the transformer and by parasitic capacitances so that the said voltage may be positive without this situation involving a demagnetization. An instability may be produced if no distinction is made in the control of the transistor between the intervals in which demagnetization and those in which oscillation takes place.

The measures taken for this purpose are elucidated with reference to the diagrams of FIG. 4 which are also useful for clarifying the foregoing description. These diagrams apply to the case of a supply circuit tuned by a capacitor arranged parallel to transistor Tr. FIG. 4a shows the secondary voltage as a function of time. In FIG. 4b the collector current of transistor Tr is denoted by a solid line and the secondary current transformed to the primary side is denoted by a broken line. The transistor is turned on between instants $t_1$ and $t_2$. It is apparent from these diagrams that only the secondary current flowing between instant $t_2$ and the first zero-crossing of the secondary voltage at instant $t_3$ is demagnetizing and that an oscillation occurs after $t_3$.

Amplifier 64 fixes the instants when the voltage across winding L2 does not become zero, but exceeds the value 100 mV so as to make a distinction between the rest state, in which this voltage is zero, and the state with a short-circuited output voltage in which diode $D_o$ conducts with a voltage drop of several tenths of one Volt thereacross. If the voltage across winding L2 is higher than 100 mV, the signal at the output of amplifier 64 becomes high (FIG. 4c). The falling edges of this signal, which occur when the voltage across winding L2 becomes lower than 100 mV, are delayed by means of element 66 having a delay d set by means of a capacitor 68. The falling, delayed edges of the signal obtained at the output of element 66 (FIG. 4d) are applied to flip-flop 86 for resetting this flip-flop and to switch 65 for rendering this switch non-conducting. In FIG. 4e a solid line denotes the sawtooth-shaped voltage generated across capacitor 61 and a broken line denotes the voltage $V_s$. The output signal of modulator 7 is shown in FIG. 4f. Without amplifier 88 the rising edges of this signal would set flip-flop 86. The diagram of FIG. 4g represents the signal at the output Q of flip-flop 86 and the diagrams of FIGS. 4h and 4i represent the signal at the output of gate 85 and the signal at the output of gate 81.

It is apparent from the diagrams of FIG. 4 that diode 84 is blocked at the instant $t_1$ which is determined by the delay d, so that transistor Tr is turned on. At the instant when $V_r$ and $V_s$ cross each other in FIG. 4e, diode 84 becomes conducting again. After this instant the transistor is turned off at instant $t_2$ after an interval which is determined by the storage time of the transistor and by delays which may be caused by the control process. After transistor Tr has been turned off, ringing effects may be produced which are caused by leakage inductances and parasitic capacitances. As a consequence thereof the secondary voltage (FIG. 4a) does not immediately assume the value $V_o$ but oscillates around this value. At a low value of voltage $V_o$ the first of these oscillations might drop below zero so that the signal of FIG. 4c would have a falling edge and transistor Tr would be turned on. This is prevented in that this edge is delayed by means of element 66. Similarly, the transistor would be turned on at instant $t_3$. The signal of FIG. 4i ensures that this is not effected until after the delay d. An improvement of the described facilities for demagnetization protection is that the information applied to amplifier 64 about the secondary voltage originates from the secondary winding, in this example L2, which has the largest number of turns.

The properties of the supply circuit during the start operation are improved in that the demagnetizing signal from element 66 activates stage 83 only if flip-flop 86 is set, which is effected via gate 87 if the output signal of modulator 7 is positive, or if voltage $V_s$ is higher than 1.5 V, which is established by means of amplifier 88, or if detector 37 supplies the information that voltage $V_b$ is not lower than 5 V. The latter two criteria are added to guarantee demagnetization if transistor Tr does not convey enough base current during the start so that the sawtooth in FIG. 4e does not reach the level $V_r$ and modulator 7 does not yet supply a signal for setting flip-flop 86. FIG. 4g shows that the flip-flop is set at the instant when voltage $V_s$ exceeds the value 1.5 V.

A plurality of parts of the supply circuit of FIG. 1 has been described extensively in the foregoing. It will be evident that many modifications are possible within the scope of the invention. For example, the type of supply circuit, for example, self-oscillating or not self-oscillating, constant switching frequency or no constant switching frequency, tuned or not tuned are irrelevant to the invention. The same applies to the switching element used and to a number of details in FIG. 2, for example, the generation of the sawtooth which may also be effected at the primary side if a DC separation is not required, for example, with the aid of an emitter-resistor of transistor Tr.

I claim:

1. A switched-mode power supply circuit comprising: a series arrangement of an inductive element and a controllable switch coupled between the terminals of a DC input voltage, a rectifier coupled to the inductive element for supplying a DC output voltage to a load connected thereto, a control circuit coupled to the controllable switch for rendering the controllable switch alternately conducting and non-conducting, a pulse duration modulator coupled to the control circuit for determining the duration of the conductivity time of the controllable switch, a function generator for applying a signal, which is a given function of the output voltage, to a control input of the modulator for maintaining the output voltage at a substantially constant, first value which is independent of the input voltage and the load, and means for bringing the output voltage to a second value which is considerably lower than the first value by reducing the conductivity time of the controllable switch, a selection circuit for passing a signal of a starting circuit to the control input of the pulse duration modulator at said second value of the output voltage for increasing the duration of the conductivity time of the controllable switch to increase the output voltage to the first value, said signal of the starting circuit corresponding to a shorter conductivity time of the controllable switch than the signal of the function generator at said second value of the output voltage, said selection circuit passing on the signal of the function generator to said control input at the first value of the output voltage.

2. A power supply circuit as claimed in claim 1, wherein the selection circuit comprises a minimum value transmission circuit for passing on a control signal to the control input of the modulator, a lower value of the control signal corresponding to a shorter conductivity time of the controllable switch, and conversely.

3. A power supply circuit as claimed in claim 2, wherein the starting circuit comprises a source for charging a storage element, the signal of the storage element being higher than the signal from the function generator at the first value of the output voltage, and being lower than said signal at the second value of the output voltage or a value which is higher than a predetermined value which is higher than the first value.

4. A circuit as claimed in claim 3, characterized in that a clamping circuit is connected to the storage element for clamping the signal of the storage element at a value which is dependent on the output voltage and is higher than the signal from the function generator at the first value of the output voltage.

5. A circuit as claimed in claim 4, wherein the clamping circuit comprises a switch connected parallel to the storage element which comprises a capacitor, and a comparison stage for comparing the voltage across the capacitor with a voltage which is equal or proportional to the output voltage thereby to control the switch, the switch being made to conduct at a capacitor voltage which is higher than the compared voltage and being blocked at a capacitor voltage lower than the compared voltage.

6. A power supply circuit as claimed in claim 5, wherein resistor for determining the peak value of the current through the controllable switch is connected parallel to the capacitor.

7. A power supply circuit as claimed in claim 4, further comprising an adder stage for adding a signal to the signal of the storage element so as to determine the minimum conductivity time of the controllable switch.

8. A power supply circuit as claimed in claim 4, further comprising bistable element for discharging the storage element in a first state, for rendering the clamping circuit inoperative and for blocking the controllable switch at a value of the output voltage which is higher than a predetermined value.

9. A power supply circuit as claimed in claim 8, wherein the bistable element is in its second state when the signal of the storage element is lower than a further predetermined value, in which second state both the signal of the storage element and the output voltage increase while the clamping circuit is operative.

10. A power supply circuit as claimed in claim 3, further comprising a minimum value detector for discharging the storage element and for blocking the controllable switch when a supply voltage derived from the input voltage is lower than a predetermined value.

11. A circuit as claimed in claim 10, characterized in that the minimum value detector releases the storage element and the controllable switch during the transition of the output voltage from the second value to the first value.

12. A power supply circuit as claimed in claim 1, wherein said function generator has a transfer characteristic which exhibits a sharp break-point between a zero value of said output voltage and said first value of the output voltage.

13. A power supply circuit as claimed in claim 1, wherein said function generator produces a given value signal ($V_{ro}$) at a zero value of the output voltage.

14. A power supply circuit as claimed in claim 1, wherein said inductive element comprises a transformer having a primary winding connected in said series arrangement with the controllable switch and a first secondary winding coupled to said output terminal via said rectifier and a second secondary winding coupled to a second rectifier, and wherein said primary winding is wound in the same sense as the second secondary winding and in opposite sense to the first secondary winding.

15. A switched-mode power supply circuit comprising:
- an inductive element and a controllable switch connected in series circuit to terminals of a source of input voltage,
- a rectifier coupled to the inductive element and to an output terminal for supplying a DC output voltage to a load,
- a control circuit coupled to a control electrode of the controllable switch for turning the controllable switch on and off,
- a pulse duration modulator coupled to the control circuit to control the on-time of the controllable switch,
- a function generator for applying to a control input of the pulse duration modulator a signal which is a given function of the output voltage thereby to regulate the output voltage at a substantially constant first value which is independent of the input voltage and of a load connected to the output terminal,
- means for bringing the output voltage to a second value much lower than said first value by reducing the on-time of the controllable switch,
- a starting circuit which comprises a storage element and means for charging the storage element,
- a selection circuit which comprises a minimum value transmission circuit for passing a control signal to the control input of the modulator, a lower value of the control signal corresponding to a shorter on-time of the controllable switch, and vise versa, said selection circuit passing a signal from the starting circuit to the control input of the pulse duration modulator at said second value of the output voltage for increasing the on-time of the controllable switch thereby to increase the output voltage to the first value, said signal of the starting circuit corresponding to a shorter on-time of the controllable switch than the signal of the function generator at said second value of the output voltage, said selection circuit passing the signal of the function generator to said control input at the first value of the output voltage, and wherein
- the signal of the storage element is higher than the signal from the function generator at the first value of the output voltage and is lower than said signal at the second value of the output voltage or at a predetermined value which is higher than the first value.

* * * * *

UNITED STATES PATENT AND TRADEMARK OFFICE
CERTIFICATE OF CORRECTION

PATENT NO. : 5,041,956
DATED : August 20, 1991
INVENTOR(S) : Antonius A.M. Marinus It is certified that error appears in the above-indentified patent and that said Letters Patent is hereby corrected as shown below:

On the title page, Abstract: Item [57]:

Line 5, delete ","
Line 6, delete "on"
Line 7, delete "the output voltage".

Column 12, Claim 4, line 1, after "A" insert --power supply--.
Column 12, Claim 5, line 1, after "A" insert --power supply--.
Column 13, Claim 11, line 1, after "A" insert --power supply--.
Column 14, Claim 15, line 23, change "vise" to --vice--.

Signed and Sealed this

Twenty-first Day of December, 1993

Attest:

BRUCE LEHMAN

*Attesting Officer*  *Commissioner of Patents and Trademarks*